United States Patent [19]

Oki et al.

[11] Patent Number: 5,090,969
[45] Date of Patent: Feb. 25, 1992

[54] COATED ABRASIVE GRAINS AND A MANUFACTURING METHOD THEREFOR

[75] Inventors: Takeo Oki, 3-39, Tennohdori, Tushima-shi, Aichi-ken; Yoichi Fukuta; Eiichi Hisada, both of Nagoya; Satoshi Aoki, Aichi, all of Japan

[73] Assignees: Takeo Oki; Noritake Co., Ltd., both of Aichi, Japan

[21] Appl. No.: 425,255

[22] Filed: Oct. 23, 1989

Related U.S. Application Data

[62] Division of Ser. No. 260,752, Oct. 21, 1988.

[30] Foreign Application Priority Data

Oct. 21, 1987 [JP]  Japan ................................ 62-265952
Mar. 11, 1988 [JP]  Japan ................................ 63-57642

[51] Int. Cl.$^5$ ............................................. B24D 11/00
[52] U.S. Cl. .......................................... 51/295; 51/308; 51/309
[58] Field of Search ........................... 51/295, 308, 309

[56] References Cited

U.S. PATENT DOCUMENTS

| | | | |
|---|---|---|---|
| 3,465,416 | 9/1969 | Wellborn | 29/473.1 |
| 3,520,667 | 7/1970 | Taylor | 51/295 |
| 3,617,346 | 11/1971 | Chance | 117/56 |
| 3,650,714 | 3/1972 | Farkas | 51/295 |
| 3,826,630 | 7/1974 | Roy | 29/195 |
| 3,924,031 | 12/1975 | Nicholas et al. | 51/295 |
| 3,929,432 | 12/1975 | Caveney | 51/295 |
| 4,063,907 | 12/1977 | Lee et al. | 51/295 |
| 4,142,869 | 3/1979 | Vereschagen et al. | 51/295 |
| 4,157,897 | 6/1979 | Keat | 51/295 |
| 4,220,455 | 9/1980 | St. Pierre et al. | 51/295 |
| 4,399,167 | 8/1983 | Pipkin | 51/295 |
| 4,406,667 | 9/1983 | Sarin et al. | 51/295 |
| 4,411,672 | 10/1983 | Ishizuka | 51/309 |
| 4,416,670 | 11/1983 | Sarin et al. | 51/295 |
| 4,417,906 | 11/1983 | Ohno | 51/307 |
| 4,505,720 | 3/1985 | Gabor et al. | 51/295 |
| 4,539,018 | 9/1985 | Whanger et al. | 51/309 |
| 4,606,738 | 8/1986 | Hayden | 51/295 |
| 4,776,862 | 10/1988 | Wiand | 51/293 |

FOREIGN PATENT DOCUMENTS

| | | |
|---|---|---|
| 55-162499 | 12/1980 | Japan . |
| 62-027577 | 2/1987 | Japan . |
| 1478510 | 7/1977 | United Kingdom . |
| 1558599 | 1/1980 | United Kingdom . |

OTHER PUBLICATIONS

World Patents Index (WPI) English Abstract of JP 55-162499.
World Patents Index (WPI) English Abstract of JP 62-027577.

Primary Examiner—William R. Dixon, Jr.
Assistant Examiner—Willie J. Thompson
Attorney, Agent, or Firm—Sughrue, Mion, Zinn, Macpeak & Seas

[57] ABSTRACT

Coated abrasive grains and a manufacturing method for them are disclosed. The abrasive grains are coated using an immersion method with a coating comprising at least one substance selected from carbides, borides, and nitrides of a metal, comprising:
preparing an immersion bath comprising a molten salt bath containing said metal; and
immersing abrasive grains to be treated in said immersion bath for a suitable length of time.

12 Claims, 5 Drawing Sheets

COATED ABRASIVE GRAINS AND A MANUFACTURING METHOD THEREFOR

This is a divisional of allowed application No. 07/260,752 filed Oct. 21, 1988.

BACKGROUND OF THE INVENTION

This invention relates to coated abrasive grains and to a manufacturing method therefor, and particularly to coated abrasive grains obtained by an immersion method. More specifically, it relates to coated abrasive grains and a manufacturing method therefor in which a molten salt bath is employed, and the abrasive grains are coated with a layer of a metal compound such as at least one substance selected from metallic carbides, metallic borides, and metallic nitrides.

Abrasive grains such as diamond abrasive grains and hard BN abrasive grains are referred to as ultrahard abrasive grains and are widely used as starting materials for abrasive articles or as abrasives. In particular, abrasive grains comprising natural or synthetic diamonds are bonded together with a binder in the form of a metal, a synthetic resin, or a vitreous inorganic material to form abrasive articles, such as grinding wheels. These abrasive articles have a wide range of uses including the grinding of carbide tools and hard materials such as ceramics, ferrite, and glass, and the cutting of stones and concrete. As a result of the spectacular development of ceramics in recent years, diamond wheels and hard BN wheels, which enable high-precision grinding of ceramics, have been used in large quantities.

However, presently-used abrasive grains have the following problems.

For example, in the case of resin-bonded wheels or metal-bonded wheels which have diamond abrasive grains as their main component, in order to increase the bond strength between the abrasive grains and the resin or metal which serves as a binder, the surfaces of the abrasive grains are coated with a metal such as nickel. This metal coating is said to have the effect of preventing the deterioration of the resin due to heat which is generated along the edges of the abrasive grains during use of a grinding wheel. However, the metal coating has the problem that it causes the clogging of the wheel.

On the other hand, vitrified-bonded wheels which also have diamond abrasive grains as their main component use a ceramic as a binder. As these wheels are manufactured by firing at high temperatures, the bonding strength between the abrasive grains and the binder is high due to a solid phase reaction. However, during the high-temperature firing, the diamond abrasive grains undergo thermal corrosion, and as a result manufacture is difficult.

Japanese Published Unexamined Patent Application No. 55-162499 (1980) disclosed a method of coating the surface of diamond abrasive grains with Ti(C,N,O) by chemical vapor deposition in order to prevent oxidation of the abrasive grains during manufacture of wheels, improve the adhesion to coatings, and prevent the clogging of the wheel during grinding. However, the adhesion of a coating formed by this method is said to be inadequate.

Thus, as the advantages of coated abrasive grains have been recognized, various methods have been proposed for improving the properties thereof. However, as all of these methods employ CVD or other vapor phase deposition processes, they are unsuitable for mass production, and they require large and expensive equipment in order to be carried out.

The following U.S. patents are issued regarding coated diamond abrasive grains of the prior art: U.S. Pat. Nos. 3,465,416; 3,520,667; 3,617,346; 3,650,714; 3,826,630; 3,924,031; 3,929,432; 4,063,907; 4,220,455; 4,417,906; and 4,606,738.

Accordingly, in order to take advantage of the above-described excellent properties of coated abrasive grains, there is a need for a method which can easily and greatly improve the adhesion to coatings of coated abrasive grains and which at the same time is inexpensive.

SUMMARY OF THE INVENTION

Therefore, an object of the present invention is to provide ultrahard coated abrasive grains and a method for the manufacture, thereof, the abrasive grains having superior oxidation resistance, wear resistance, and adhesion to coatings.

Another object of the present invention is to provide ultrahard coated abrasive grains having the above properties and a method for their manufacture which is less expensive and more suitable for mass production than CVD.

In Japanese Published Unexamined Patent Application No. 62-27577 (1987), one of the present invention proposed a method for forming a hard coating on the surface of a metal using a molten chloride bath. It was found that this method greatly increases both the hardness of the surface of the metal and the wear resistance.

As a result of subsequent research, it was found that this method is applicable not only to metals but to nonmetals as well. Particularly in the case of nonmetals, this method not only improves hardness, but the adhesion of the coating to the surface is remarkably increased. This is because it employs a molten salt bath, and a portion of the surface to be treated is roughened.

Upon further investigation concerning the application of an immersion method for accomplishing the above objective, it was found that coating the surface of abrasive grains produces remarkable effects, and the present invention was completed.

Accordingly, the present invention provides coated abrasive grains comprising abrasive grains whose surfaces are coated by an immersion method with a coating comprising at least one substance selected from carbides, borides, and nitrides of a metal.

The term "immersion method" here refers to a method in which abrasive grains are immersed in a molten salt bath to form a surface coating.

The present invention also provides a manufacturing method for coated abrasive grains in which a coating comprising at least one substance selected from carbides, borides, and nitrides of a metal is formed on the surfaces of abrasive grains by an immersion method, wherein an immersion bath comprising a molten salt bath containing the metal is prepared and abrasive grains to be treated are immersed in the immersion bath for a suitable length of time.

The coated grains of the present invention can be used without further treatment, or if necessary, they may be subjected to after-treatment by further coating, such as by plating, of a metallic compound, a metal, or an alloy.

In preferred embodiments of the present invention, the abrasive grains are diamond abrasive grains or hard BN grains.

When forming a metallic carbide coating, and particularly when the abrasive grains are hard BN abrasive grains, it is preferable to use hard BN abrasive grains on which carbon was previously deposited by vapor deposition. Furthermore, when a thick metallic carbide coating is desired, diamond abrasive grains previously coated with a carbon coating by carbon vapor deposition or other method can be used. The carbon in the surface layer of the abrasive grain reacts with the metal in the immersion bath to form a carbide coating. Alternatively, if uncoated hard BN abrasive grains are immersed, B is substituted by a metal in the immersion bath by a substitution reaction, and the resulting coating comprises a nitride of the metal coming from the immersion bath.

The molten salt bath preferably comprises at least one substance selected from chlorides of an alkali metal and chlorides of an alkali earth metal. In a further preferred embodiment, the molten salt bath is a fluoride-containing chloride bath. The fluoride may comprise at least one substance selected from fluorides of an alkali metal and fluorides of an alkali earth metal.

In accordance with a different mode of the invention, the molten salt bath may be a fluoride-containing molten bromide bath, a fluoride-containing molten iodide bath, or a fluoride-containing molten fluoride bath, and the immersion bath may be prepared by adding one or more of oxides of a metal, and halides of a metal, a metal in elemental form, and alloys thereof to the molten salt bath. In this case, the fluoride, the bromide, or the iodide is preferably a fluoride, a bromide, or an iodide of an alkali metal or an alkali earth metal.

In a preferred embodiment, the immersion bath is prepared by adding an oxide and/or halide of a metal together with a metal in elemental form or an alloy thereof to the molten salt bath.

When the immersion treatment is performed with different types of metals, it can be preformed two or more times.

In accordance with yet another mode of the invention, a manufacturing method for abrasive grains coated with a boron compound is provided in which an immersion bath is prepared by adding at least one of an oxide of boron, a boron alloy, and a boron-containing carbide ($B_4C$), preferably an oxide of boron and a boron alloy (or boron carbide) to a fluoride-containing molten halide bath, and uncoated abrasive grains or abrasive grains previously coated with a substance selected from Ti, Cr, V, W, Mo, Zr, Hf, Nb, Ta, Ni, and alloys or compounds thereof are immersed in the immersion bath for a suitable length of time. Coated abrasive grains of the present invention may of course be used instead of the above-described metal-coated abrasive grains.

The "coating" of abrasive grains with a metal (a metal in elemental form, a metal alloy, or a metal compound) does not necessarily refer to completely enveloping the abrasive grains in the metal or to plating it with the metal. It is necessary only that the metal be applied to at least the surface to be treated. Many different methods can be employed for applying the metal, including electroplating, electroless plating, cladding, physical vapor deposition (sputtering, etc.), and chemical vapor deposition (vapor plating, etc.). There is no restriction on the shape of the abrasive grains.

DESCRIPTION OF THE PREFERRED EMBODIMENTS

Figure 1:
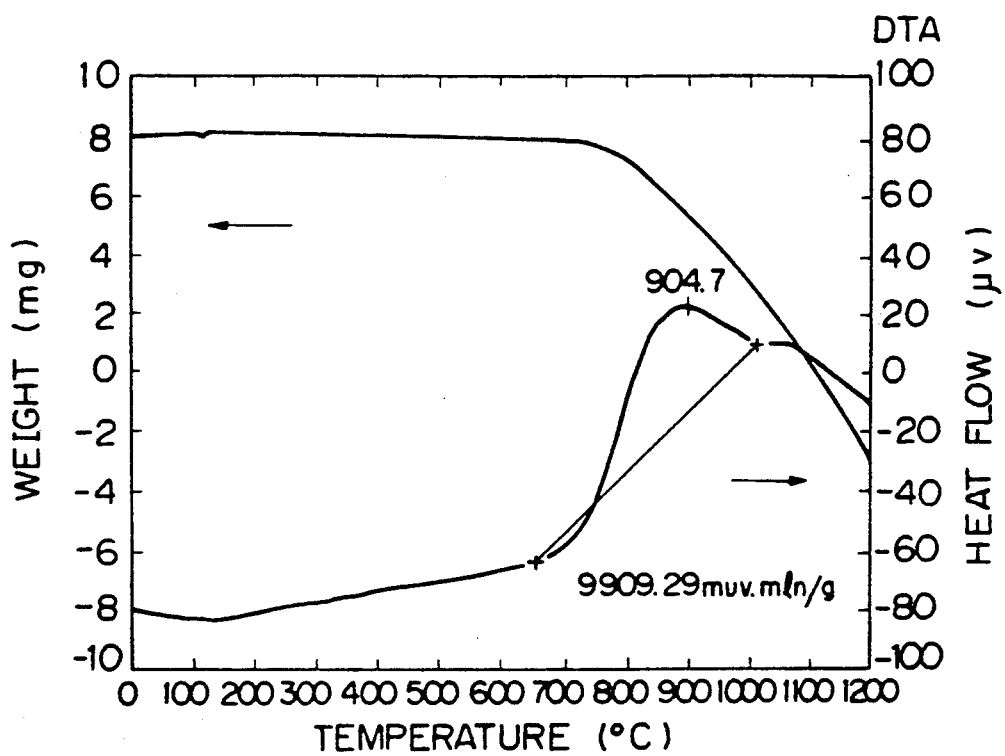
FIG. 1 is a graph showing the oxidation resistance of conventional uncoated diamond abrasive grains.

The present invention will be explained more concretely.

A molten chloride bath, which is a representative example of a molten salt bath which constitutes the immersion bath employed in the present invention, generally comprises $KCl$-$BaCl_2$ to which a fluoride such as NaF is added. Other examples of chlorides which can be employed for the molten chloride bath are NaCl, LiCl, and $CaCl_2$, and other examples of fluorides are NaF, KF, LiF, $CaF_2$, and $BaF_2$. Preferably, the bath comprises a chloride of an alkali metal, a chloride of an alkali earth metal, and a fluoride of an alkali metal. The exact proportions of the components will be readily apparent to those skilled in the art from the foregoing explanation. However, with a $KCl$-$BaCl_2$-NaF bath, the proportions are generally 5-95 mole %, of KCl, 5-95 mole % of $BaCl_2$, and 5-50 mole % of NaF. If the proportion of the fluoride is greater than 50 mole %, not only does the bath temperature become too high, but also corrosion becomes a problem.

Alternatively, a bromide, an iodide, or a fluoride can be used in place of the chloride in the molten salt bath. As in the case in which a chloride is employed, the bromide, the iodide, or the fluoride is preferably selected from bromides, iodides, and fluorides of an alkali metal or an alkali earth metal.

There is no particular restriction on the type of metal which is added to the molten bath. However, as one of the purposes of the present invention is to increase the adhesion of a coating to the abrasive grains being treated, hard metals which have in the past been thought hard to form into coatings are preferred, some examples of which are Si, Cr, V, B, W, Mo, Ti, Zr, Hf, Nb, Ta, and other members or groups IVa, Va, and VIa of the periodic table.

It is advantageous that a portion of the metal which is added to the molten salt bath be in the form of a compound (typically an oxide), since metallic compounds are easy to obtain and convenient to handle. It is also advantageous that another portion of the metal be in the form of a metal powder. The metal powder may be in elemental form or in the form of an alloy, such as ferroalloy.

When sodium fluoride is used as the fluoride, the NaF and the oxides react in the molten salt bath containing potassium and/or sodium, and potassium and/or sodium metal fluorides are formed partially. These substances are formed by reactions such as $TiO_2 \rightarrow NaK_2$-

$TiF_6$, $Cr_2O_3 \rightarrow NaCrF_3$, $V_2O_5 \rightarrow Na_3VF_6$, $B_2O_3 \rightarrow KBF_4$, and $WO_3 \rightarrow K_3WF_6$. The resulting substances then react on the surfaces of the abrasive grains and respectively become Ti-C (TiC), Cr-C ($Cr_7C_3$, $Cr_3C_2$, $Cr_{23}C_6$), V-C ($V_2C$, $V_4C_3$, $V_8C_7$, $VC_{0.88}$), B-C, W-C, and the like. At this time, the metal in elemental or alloyed form is thought to act as a reducing agent for the metal which was added to the bath in the form of a metallic oxide.

There is no restriction on the amount of the metal to be added in elemental or alloyed form, but is is adequate if an oxide of such a metal constitutes 2 weight % of the immersion bath. If the amount of the metal is too small, a coating of sufficient thickness can not be obtained, and under usual conditions the lower limit is about 1 weight %. On the other hand, if the amount of metal is too large, the thickness of the resulting carbide coating becomes nonuniform. Under usual conditions, the upper limit is about 7 weight %. Preferably, the amount of metal is 5-7 weight %.

The metal may be added to the molten salt bath in the form of a halide.

When such a metallic halide is used, the molten salt bath may contain up to 40 weight % of the metallic halide. If the amount of metallic halide exceeds this level, the corrosion of equipment becomes a problem, and a health problem is created by the generation of large amounts of halogen gas.

When a metal which is added to the molten salt bath is in the form of an oxide, a reducing agent for the oxide is also added to the bath. Examples of reducing agents are substances having a greater affinity for oxygen than the metal, e.g., chromium or group Va elements, such as Mn, Al, Ca, Si, Ti, and Zr, as well as alloys thereof such as Fe-Mn, Fe-Al, Fe-Ti, Fe-Zr, Fe-Si, Ca-Si, and Ca-Si-Mn. The reducing agent may constitute 2-20 weight % of the treatment bath. If less than 2 weight % is added, an adequate reducing effect is not obtained, and if more than 20 weight % is added, the formation of carbides is obstructed. Preferably, the proportion of the reducing agent is 5-15 weight %.

The immersion time and temperature for the immersion method of the present invention vary in accordance with the type of metal compound which is to be formed, but in general it is sufficient to perform immersion at 700°-1000° C. for from one to several hours.

The ultrahard abrasive grains which are employed in the present invention are preferably diamond abrasive grains, hard BN abrasive grains, or a mixture thereof. There is no particular restriction on the type of diamond abrasive grains which are employed, and abrasive grains of either natural or synthetic diamonds may be used. There is no particular limitation on grain size, but when the diamond or hard BN abrasive grains are to be made into a grinding wheel using a suitable binder, in general it is preferable that the grain sizes be approximately 140-170 mesh or 50-60 mesh.

Prior to immersion, it is not necessary to perform any preliminary treatment of the diamond abrasive grains or the hard BN abrasive grains. However, if degreasing or similar treatment is performed, the adhesion of the coating to be formed on the grains can be further increased.

As explained earlier, the formation of a coating by immersion in accordance with present invention can also be performed on abrasive grains which have been previously coated with a suitable metal by CVD, vacuum sputtering, or other method.

However, the previously-applied coating is not restricted to a coating of a metal, and it can be a coating of a metallic compound in accordance with the present invention. Namely, by treating the surface of the abrasive grains which were coated with a metallic compound, e.g., a metallic carbide in the above manner by second time using the same type of molten salt bath, the metal in the coating which is already formed on the surface of the abrasive grains combines with another metal in the bath, and a second coating is formed. In this case, the metal in the bath which combines with the metal in the coating is preferably B, which is present in the bath in the form of an oxide such as $B_2O_3$. As a result, the second coating is a metallic boride coating. Namely, an oxide is boron (such as boron oxide) reacts in the fluoride-containing molten salt bath (e.g., $B_2O_3 \rightarrow KBF_4$). The resulting compound reacts with a metal (such as Ti) in the first coating to form a substance $MB_2$ or MB (such as $TiB_2$ or TiB), wherein M stands for a metal. As a result of this treatment, the oxidation resistance of the abrasive grains is further improved.

Next, the present invention will be described more concretely on the basis of the following examples. In the examples, unless otherwise indicated, % refers to % by weight.

Example 1

42.2 mole % of KCl, 20.2 mole % of $BaCl_2$, and 37.6 mole % of NaF were placed in a porcelain crucible and then melted by heating. Next, prescribed quantities of metallic oxides and alloy powders (ferroalloys) were added and the mixtures was thoroughly stirred to obtain an immersion bath.

2 g of diamond abrasive grains having a grain size of 50-60 mesh (tradename "MBS" manufactured by General Electric) were immersed in this immersion bath at 850° C. for 2 hours. The average coating thickness was 1.8 μm. The types and quantities of metallic oxides and alloys used in this example as well as the composition of the resulting coating are shown in Table 1.

The immersion of the abrasive grains was performed using a stainless steel wire mesh bucket.

The resulting coated abrasive grains were placed together with 14 sintered carbide balls having a diameter of 4.6 mm into a tempered hard glass bottle (16.5 mm in diameter, 30 ml). The glass bottle was rotated at 150 rpm for 15 minutes, after which the coating adhesion was evaluated by comparing the weight of coating which had peeled off to the initial weight. The results are shown in Table 1.

Figure 2:
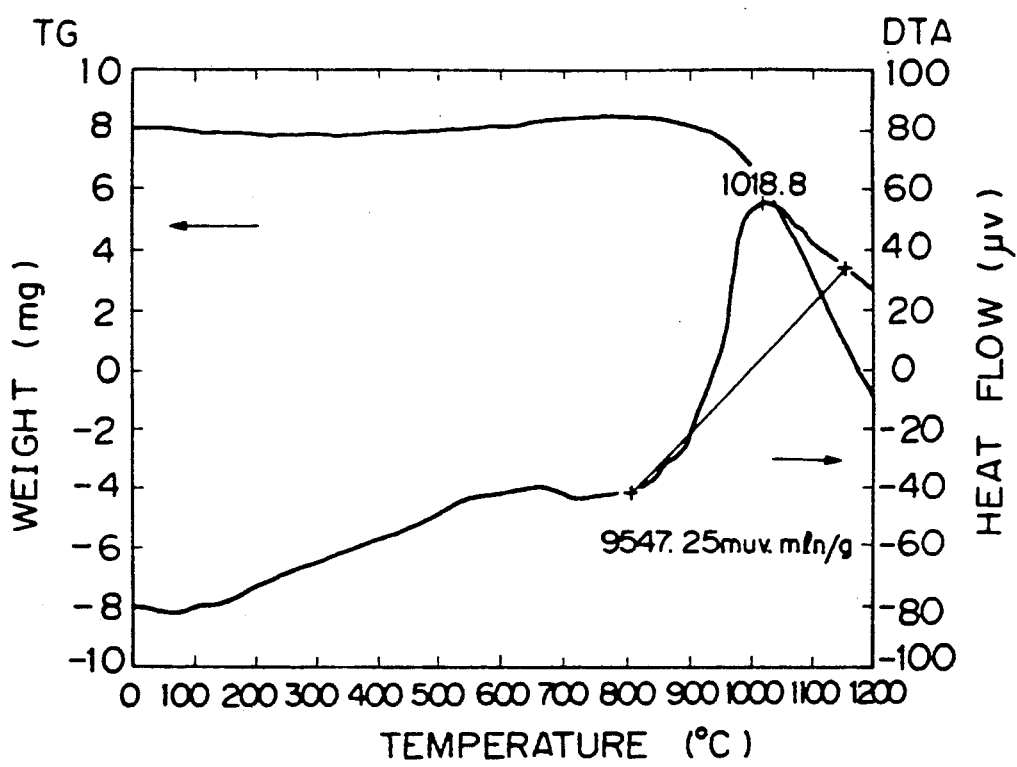
FIG. 2 is a graph showing the oxidation resistance of coated diamond abrasive grains in accordance with this invention.

FIG. 1 and FIG. 2 are graphs which show the DTA (differential thermal analysis) curve and the TGA (thermogravimetric analysis) curve for uncoated diamond abrasive grains (FIG. 1) and for abrasive grains which were coated in the above manner with a caride of chromium (Test No. 2, FIG. 2).

If the curves of FIG. 2 for coated abrasive grains of the present invention are compared with the curves of FIG. 1 for a conventional example, it can be seen that the temperature which shows the peak of heat flow increased from 904° C. to 1018.9° C., and the temperature at which oxidation loss occurred also increased. It is therefore clear that the oxidation resistance of the abrasive grains of the present invention is far superior to that of the conventional example.

Figure 3A:
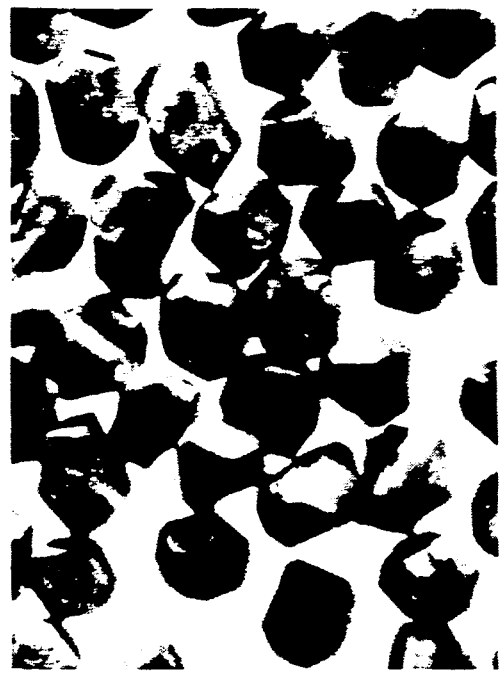
FIGS. 3a and 3b are photomicrographs ($\times 45$) showing the surface condition of diamond abrasive grains coated with TiC and of peeled material, respectively, after a peeling test.
Figure 3B:

FIGS. 3a and 3b are photomicrographs (×45) showing the state of the surface coating and of peeled material from diamond abrasive grains coated with a TiC coating (formed in a manner similar to that used for Test No. 1) after the completion of the above-described peeling test. There was substantially no peeling of the coating, and the only reduction in the size of the grains was due to chipping. The coated abrasive grains of FIGS. 3a, 3b were prepared by immersion at 900° C. for 3 hours, and the thickness of the TiC coating was 5 μm.

Figure 4A:
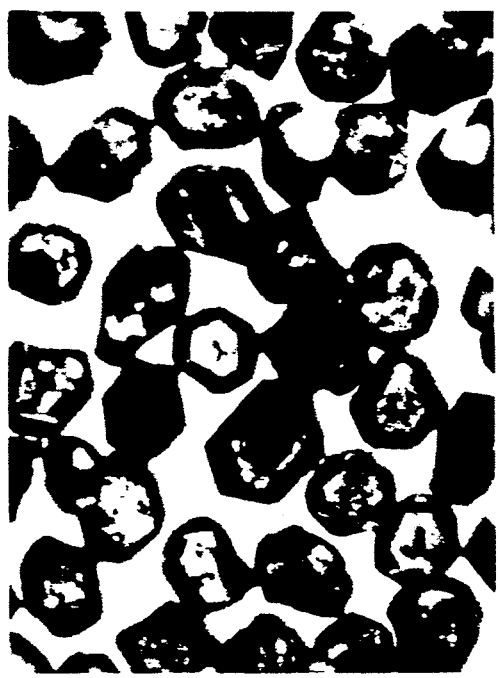
FIGS. 4a and 4b are photomicrographs ($\times 45$) showing the surface condition of uncoated diamond abrasive grains and of peeled material, respectively, after a peeling test.
Figure 4B:

Similarly, FIGS. 4a and 4b are photomicrographs (×45) showing the state of the surface coating and of peeled material after the completion of a peeling test of diamond abrasive grains which were not coated with a coating in accordance with the present invention. It can be seen that the abrasive grains of FIGS. 4a, 4b underwent a greater reduction in size than did the abrasive grains of FIGS. 3a, 3b, demonstrating that the coating of the present invention is effective not only for preventing peeling but also for preventing chipping.

Figure 5:
FIG. 5 is an electron microscope photograph ($\times 1500$) of the surface of a piece of the coated abrasive grains shown in FIG. 3.

FIG. 5 is an electron microscope photograph (×1500) of the surface of a piece of the coated abrasive grains of FIG. 3a. It clearly shows that the TiC coating is adhered to the surface of the abrasive grains.

Figure 6:
FIG. 6 is a photograph ($\times 3000$) taken with an X-ray microanalyzer showing the distribution of elemental Ti in the same coated abrasive grains.

FIG. 6 is a photograph (×3000) which was produced by an X-ray microanalyzer and which shows the distribution of elemental Ti in the same coated abrasive grain. It can be seen that Ti is adequately dispersed among the diamond abrasive grains.

Coated diamond abrasive grains in accordance with the present invention which were obtained in the above-described manner were used as a starting material powder for the manufacture of a metal-bonded diamond whetstone. It was found to have a working life of roughly three times that of a metal-bonded diamond whetstone made from conventional uncoated diamond abrasive grains.

Example 2

The coated diamond abrasive grains of Example 1 were coated with a second layer in the form of boride coating using the method of the present invention. Namely, $B_2O_3$ and boron in elemental form were added to the above-described molten salt bath to prepare an immersion bath, and then the procedure of Example 1 was followed. The same peeling resistance test as for Example 1 was performed on the resulting abrasive grains. The compositions of the resulting coatings and the test results are shown in Table 2.

Immersion was carried out at 850° C. for one hour. Each of the coating thickness shown in Table 2 is the total of the first layer (the carbide coating) and the second layer (the boride coating).

Example 3

In this example, diamond abrasive grains were employed which had been previously coated with a metallic layer (2 μm thick) of Ti, Cr, V, W, or Mo using chemical vapor deposition. The previously-coated grains were then coated with a boride coating in the same manner as in Example 2. The compositions of the coatings and the peeling characteristics of the resulting coated abrasive grains are shown in Table 3. Immersion was performed at 950° C. for 2 hours.

Example 4

In this example, a metallic layer (approximately 2 μm thick) of Ti, Cr, V, or Mo was formed by chemical vapor deposition on hard BN abrasive grains (trade name "BZN-550" manufactured by General Electric) having a grain size of 50–60 mesh. Next, a boride coating was formed atop the grains in the same manner as in Example 2. The compositions of the coatings and the peeling characteristics of the resulting coated abrasive grains are shown in Table 4. Immersion was performed at 950° C. for 2 hours.

Example 5

In this example, SiC abrasive grains (420–350 μm) were coated with a carbide coating in the manner of Example 1. The immersion bath temperature was maintained at 950° C., and the SiC abrasive grains were reacted therein for 2 hours. As in Example 1, the immersion bath contained a metallic oxide and an alloy. However, in this example the substitution reaction SiC→MeC (Me:metal) took place, and a carbide coating was formed.

The types of metallic oxides and alloys employed in the immersion bath are shown in Table 5. The table also shows the coating thickness and the amount of peeling (%) of the coating.

Example 6

In this example, a nitride coating was applied to C-BN abrasive grains (210–177 μm) in the manner of Example 1. Reaction was performed at 950° C. for 2 hours.

As when forming a carbide coating, the immersion bath contained a metallic oxide and an alloy. The substitution reaction BN→MeN (Me:metal) took place, and a nitride coating was formed. The composition of the coating and its characteristics are shown in Table 6.

Example 7

In this example, first a nitride coating was formed on BN abrasive grains (210–177 μm) in the manner of Example 6, and then a boride layer was formed atop the nitride coating in the manner of Example 2. Immersion was performed at 950° C. for one hour.

The results for this example are shown in Table 7.

Example 8

In this example, a bromide bath was employed. The bath composition was 37.6 mole % of NaF, 31.2 mole % of NaBr, and 31.2 mole % of KBr. MBS abrasive grains (50–60 mesh) were immersed in the bath at 950° C. for 2 hours.

The results are shown in Table 8.

Example 9

In this example, an immersion bath was employed which had a composition of 37.6 mole % of NaF, 31.2 mole % of NaI, and 31.2 mole % of KI. A metallic oxide, a metallic halide, a metal in elemental form, or an alloy was added to the bath, and various coatings were formed on MBS abrasive grains (50–60 mesh) in a manner like that employed in Example 1. Immersion was carried out at 950° C. for 2 hours.

The results are shown in Table 9.

Example 10

In this example, an immersion bath was employed which had a composition of 37.6 mole % of NaF and 62.4 mole % of KF. A metallic oxide, a metal in elemental form, or an alloy was added to the bath, and various coatings were formed on MBS abrasive grains (50–60 mesh) in a manner like that employed in Example 1. Immersion was carried out at 950° C. for 2 hours.

The results are shown in Table 10.

In this manner, according to the present invention, by merely performing simple immersion treatment using a molten salt bath which is easy to handle, a surface coating which has excellent adhesion and oxidation resistance not exhibited by conventional coatings is obtained. Therefore, the present invention greatly contributes to the advancement of industry.

TABLE 1

(EXAMPLE 1)

| Test No. | Metallic Oxide | Alloy | Coating Composition | Coating Thickness (μm) | Amount of Peeling (%) |
|---|---|---|---|---|---|
| 1 | $TiO_2$ | Fe—Ti | Ti—C | 2.0 | 0.5 |
| 2 | $Cr_2O_3$ | Fe—Cr | Cr—C | 1.8 | 0.4 |
| 3 | $V_2O_5$ | Fe—V | V—C | 1.8 | 0.3 |
| 4 | $WO_3$ | Fe—W | W—C | 1.9 | 0.4 |
| 5 | $MoO_3$ | Fe—Mo | Mo—C | 1.8 | 0.5 |
| 6 | $Ta_2O_5$ | Fe—Ta | Ta—C | 1.5 | 0.3 |
| 7 | $ZrO_2$ | Fe—Zr | Zr—C | 1.4 | 0.2 |
| 8 | $Nb_2O_5$ | Fe—Nb | Nb—C | 1.8 | 0.3 |
| 9 | $SiO_2$ | Si | Si—C | 0.8 | 0.3 |
| 10 | $B_2O_3$ | B | B—C | 0.5 | 0.4 |

NOTE: The thickness of the coating was determined on the surface of a piece of the peeled grains by means of an electron microscope.

TABLE 2

(EXAMPLE 2)

| Test No. | First Layer Composition | Second Layer Composition | Total Thickness of Coatings (μm) | Amount of Peeling (%) |
|---|---|---|---|---|
| 11 | Ti—C | Ti—B single layer or Ti—B, B—C composite | 2.1 | 0.6 |
| 12 | Cr—C | Cr—B single layer or Cr—B, B—C composite | 1.8 | 0.5 |
| 13 | V—C | V—B single layer or V—B, B—C composite | 1.9 | 0.4 |
| 14 | W—C | W—B single layer or W—B, B—C composite | 1.7 | 0.5 |
| 15 | Mo—C | Mo—B single layer or Mo—B, B—C composite | 1.7 | 0.5 |
| 16 | Ta—C | Ta—B single layer or Ta—B, B—C composite | 1.4 | 0.4 |
| 17 | Zr—C | Zr—B single layer or Zr—B, B—C composite | 1.3 | 0.4 |
| 18 | Nb—C | Nb—B single layer or Nb—B, B—C composite | 1.7 | 0.5 |

NOTE: The second layer was very thin (0.1~0.2 μm). A total thickness smaller than the starting layer seems to be caused by experimental errors.

TABLE 3

(EXAMPLE 3)

| Test No. | First Layer Composition | Second Layer Composition | Total Thickness of Coatings (μm) | Amount of Peeling (%) |
|---|---|---|---|---|
| 19 | Ti | Ti—B | 1.9 | 3.0 |
| 20 | Cr | Cr—B | 1.7 | 2.8 |
| 21 | V | V—B | 1.6 | 2.6 |
| 22 | W | W—B | 1.8 | 3.2 |
| 23 | Mo | Mo—B | 1.6 | 3.5 |

TABLE 4

(EXAMPLE 4)

| Test No. | First Layer Composition | Second Layer Composition | Total Thickness of Coatings (μm) | Amount of Peeling (%) |
|---|---|---|---|---|
| 24 | Ti | Ti—B | 1.8 | 3.1 |
| 25 | Cr | Cr—B | 1.7 | 2.6 |
| 26 | V | V—B | 1.5 | 2.7 |
| 27 | W | W—B | 1.8 | 3.3 |
| 28 | Mo | Mo—B | 1.6 | 3.7 |

TABLE 5

(EXAMPLE 5)

| Test No. | Metallic Oxide | Alloy | Coating Composition | Coating Thickness (μm) | Amount of Peeling (%) |
|---|---|---|---|---|---|
| 29 | $TiO_2$ | Fe—Ti | Ti—C single layer or Ti—C, Ti—Si composite | 23.0 | 1.0 |
| 30 | $Cr_2O_3$ | Fe—Cr | Cr—C single layer or Cr—C, Cr—Si composite | 25.0 | 0.9 |
| 31 | $V_2O_5$ | Fe—V | V—C single layer or V—C, V—Si composite | 5.5 | 0.6 |
| 32 | $WO_3$ | Fe—W | W—C single layer or W—C, W—Si composite | 5.6 | 0.7 |
| 33 | $MoO_3$ | Fe—Mo | Mo—C single layer or Mo—C, Mo—Si composite | 5.3 | 1.0 |
| 34 | $Ta_2O_5$ | Fe—Ta | Ta—C single layer or Ta—C, Ta—Si composite | 4.5 | 0.6 |
| 35 | $ZrO_2$ | Fe—Zr | Zr—C single layer or Zr—C, Zr—Si composite | 4.4 | 0.5 |
| 36 | $Nb_2O_5$ | Fe—Nb | Nb—C single layer or Nb—C, Nb—Si composite | 5.6 | 0.5 |

TABLE 6

(EXAMPLE 6)

| Test No. | Metallic Oxide | Alloy | Coating Composition | Coating Thickness (μm) | Amount of Peeling (%) |
|---|---|---|---|---|---|
| 37 | $TiO_2$ | Fe—Ti | Ti—N single layer or Ti—N, Ti—B composite | 9.2 | 1.2 |
| 38 | $Cr_2O_3$ | Fe—Cr | Cr—N single layer or Cr—N, Cr—B composite | 10.0 | 1.0 |

TABLE 6-continued (EXAMPLE 6)

| Test No. | Metallic Oxide | Alloy | Coating Composition | Coating Thickness ($\mu$m) | Amount of Peeling (%) |
|---|---|---|---|---|---|
| 39 | $V_2O_5$ | Fe—V | V—N single layer or V—N, V—B composite | 4.5 | 0.8 |
| 40 | $WO_3$ | Fe—W | W—N single layer or W—N, W—B composite | 4.0 | 0.5 |
| 41 | $MoO_3$ | Fe—Mo | Mo—N single layer or Mo—N, Mo—B composite | 4.0 | 0.5 |
| 42 | $Ta_2O_5$ | Fe—Ta | Ta—N single layer or Ta—N, Ta—B composite | 4.5 | 0.4 |
| 43 | $ZrO_2$ | Fe—Zr | Zr—N single layer or Zr—N, Zr—B composite | 4.3 | 0.3 |
| 44 | $Nb_2O_5$ | Fe—Nb | Nb—N single layer or Nb—N, Nb—B composite | 4.5 | 1.0 . |

TABLE 7

(EXAMPLE 7)

| Test No. | First Layer Composition | Second Layer Composition | Total Thickness of Coatings ($\mu$m) | Amount of Peeling (%) |
|---|---|---|---|---|
| 45 | Ti—N single layer or Ti—N, Ti—B composite | Ti—B single layer or Ti—B, B—N composite | 9.2 | 1.3 |
| 46 | Cr—N single layer or Cr—N, Cr—B composite | Cr—B single layer or Cr—B, B—N composite | 9.9 | 1.2 |
| 47 | V—N single layer or V—N, V—B composite | V—B single layer or V—B, B—N composite | 4.6 | 1.0 |
| 48 | W—N single layer or W—N, W—B composite | W—B single layer or W—B, B—N composite | 3.9 | 0.7 |
| 49 | Mo—N single layer or Mo—N, Mo—B composite | Mo—B single layer or Mo—B, B—N composite | 4.0 | 0.6 |
| 50 | Ta—N single layer or Ta—N, Ta—B composite | Ta—B single layer or Ta—B, B—N composite | 4.4 | 0.5 |
| 51 | Zr—N single layer or Zr—N, Zr—B composite | Zr—B single layer or Zr—B, B—N composite | 4.3 | 0.5 |
| 52 | Nb—N single layer or Nb—N, Nb—B composite | Nb—B single layer or Nb—B, B—N composite | 4.4 | 1.2 |

NOTE: The second layer was very thin (0.1~0.2 $\mu$m). A total thickness smaller than the starting layer seems to be caused by experimental errors.

TABLE 8

(EXAMPLE 8)

| Test No. | Additive to Immersion Bath | Coating Composition | Coating Thickness ($\mu$m) | Amount of Peeling (%) |
|---|---|---|---|---|
| 53 | Ti | Ti—C | 6.2 | 1.1 |
| 54 | Fe—Ti | Ti—C | 6.1 | 1.0 |
| 55 | $V_2O_5$, Al | V—C | 3.0 | 0.7 |
| 56 | $K_2TiF_6$, Fe—Ti | TiC | 6.3 | 1.1 |
| 57 | Fe—Cr | Cr—C | 5.3 | 0.9 |
| 58 | Fe—V | V—C | 5.4 | 0.4 |
| 59 | Fe—W | W—C | 5.3 | 0.8 |
| 60 | Fe—Mo | Mo—C | 5.2 | 0.9 |
| 61 | $ZrO_2$, Fe—Zr | Zr—C | 4.0 | 0.4 |
| 62 | $Nb_2O_5$, Fe—Nb | Nb—C | 5.3 | 0.4 |

NOTE: It is thought that the surface of commonly-used metals and alloys is slightly oxidized, and technically, these substances are not pure metals.

TABLE 9

(EXAMPLE 9)

| Test No. | Additive to Immersion Bath | Coating Composition | Coating Thickness ($\mu$m) | Amount of Peeling (%) |
|---|---|---|---|---|
| 63 | Ti | Ti—C | 6.1 | 1.0 |
| 64 | $V_2O_5$, Al | V—C | 3.0 | 0.7 |
| 65 | $K_2TiF_6$, Fe—Ti | Ti—C | 5.4 | 1.0 |
| 66 | Fe—Cr | Cr—C | 5.2 | 0.9 |
| 67 | Fe—V | V—C | 5.3 | 0.5 |
| 68 | $ZrO_2$, Fe—Zr | Zr—C | 4.0 | 0.5 |
| 69 | $Nb_2O_5$, Fe—Nb | Nb—C | 5.1 | 0.4 |

TABLE 10

(EXAMPLE 10)

| Test No. | Additive to Immersion Bath | Coating Composition | Coating Thickness ($\mu$m) | Amount of Peeling (%) |
|---|---|---|---|---|
| 70 | Ti | Ti—C | 10.1 | 1.5 |
| 71 | $V_2O_5$, Al | V—C | 4.5 | 0.9 |
| 72 | Fe—Cr | Cr—C | 8.9 | 1.2 |
| 73 | Fe—V | V—C | 8.1 | 1.3 |
| 74 | $ZrO_2$, Fe—Zr | Zr—C | 6.3 | 0.6 |
| 75 | $Nb_2O_5$, Fe—Nb | Nb—C | 7.8 | 0.7 |
| 76 | $TiCl_3$ | Ti—C | 2.7 | 0.8 |

We claim:

1. Coated abrasive grains comprising abrasive grains whose surfaces are coated with a coating comprising at least one substance selected from carbides, borides, and nitrides of a metal, said coating being applied by an immersion method using a fluoride-containing molten salt bath.

2. Coated abrasive grains as defined in claim 1, wherein said abrasive grains which are coated are diamond abrasive grains or hard BN abrasive grains.

3. Coated abrasive grains as defined in claim 1, wherein the carbides, borides, and nitrides are of at least one metal selected from the group consisting of the numbers of Group IVa, Va, and VIa of the periodic table.

4. Coated abrasive grains as defined in claim 1, wherein the carbides, borides, and nitrides are of at least one metal selected from the group consisting of Si, Cv, V, B, W, Mo, Ti, Zr, Hf, Nb and Ta.

5. Coated abrasive grains as defined in claim 3, wherein said abrasive grains which are coated are diamond abrasive grains or hard BN abrasive grains.

6. Coated abrasive grains as defined in claim 4, wherein said abrasive grains which are coated are diamond abrasive grains or hard BN abrasive grains.

7. Coated abrasive grains as defined in claim 1, wherein said immersion method comprises preparing an immersion bath comprising a molten salt bath containing said metal, and immersing abrasive grains to be treated in said immersion bath for a suitable length of time.

8. Coated abrasive grains as defined in claim 2, wherein said immersion method comprises preparing an immersion bath comprising a molten salt bath containing said metal, and immersing abrasive grains to be treated in said immersion bath for a suitable length of time.

9. Coated abrasive grains as defined in claim 3, wherein said immersion method comprises preparing an immersion bath comprising a molten salt bath containing said metal, and immersing abrasive grains to be treated in said immersion bath for a suitable length of time.

10. Coated abrasive grains as defined in claim 4, wherein said immersion method comprises preparing an immersion bath comprising a molten salt bath containing said metal, and immersing abrasive grains to be treated in said immersion bath for a suitable length of time.

11. Coated abrasive grains as defined in claim 1, wherein the fluoride-containing molten salt bath is a $KCl—BaCl_2—NaF$ bath, and the proportion of fluoride is not more than 50 mol %.

12. Coated abrasive grains comprising abrasive grains whose surfaces are coated with a coating comprising at least one substance selected from carbides, borides, and nitrides of a metal, said coating having been formed by a chemical reaction between the surface of the abrasive grains and a molten salt bath.

* * * * *

UNITED STATES PATENT AND TRADEMARK OFFICE
CERTIFICATE OF CORRECTION

PATENT NO. : 5,090,969
DATED      : February 25, 1992
INVENTOR(S) : Takeo Oki et al It is certified that error appears in the above-identified patent and that said Letters Patent is hereby corrected as shown below:

In claim 4, at column 13, line 1, delete "Cv" and insert therefor --Cr--.

Signed and Sealed this

Twenty-second Day of June, 1993

Attest:

MICHAEL K. KIRK

*Attesting Officer*     Acting Commissioner of Patents and Trademarks